Figure 1:
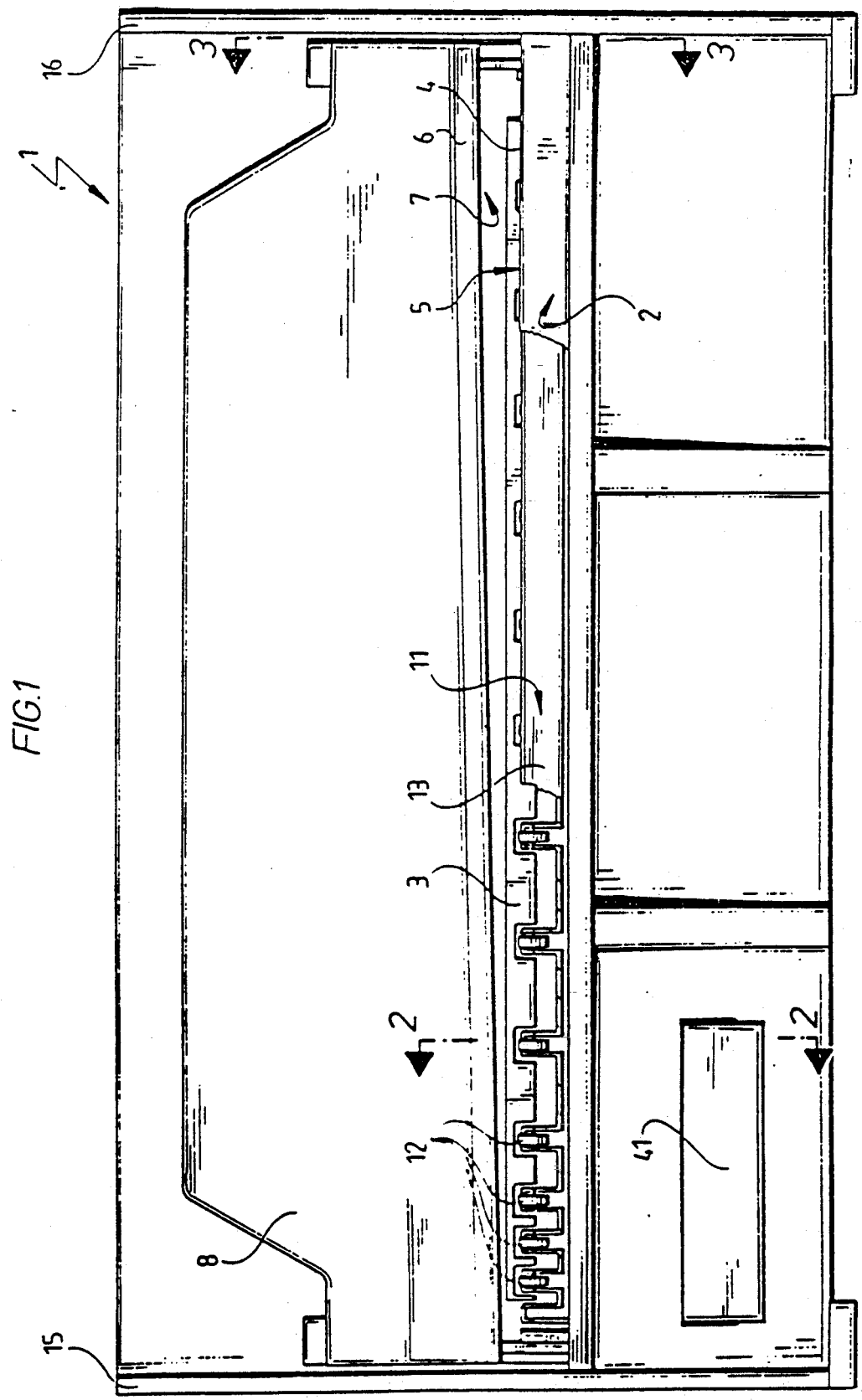

United States Patent
Kutschker et al.

[11] Patent Number: 5,179,884
[45] Date of Patent: Jan. 19, 1993

[54] PLATE SHEARS

[75] Inventors: Wolfgang Kutschker, Böblingen; Erwin Pesold, Sindelfingen, both of Fed. Rep. of Germany

[73] Assignee: Reinhardt Maschinenbau GmbH, Sindelfingen, Fed. Rep. of Germany

[21] Appl. No.: 773,585
[22] PCT Filed: Apr. 3, 1990
[86] PCT No.: PCT/EP90/00521
  § 371 Date: Nov. 19, 1991
  § 102(e) Date: Nov. 19, 1991
[87] PCT Pub. No.: WO90/14190
  PCT Pub. Date: Nov. 29, 1990

[51] Int. Cl.$^5$ ............................ B23D 33/02; B26D 7/18
[52] U.S. Cl. ............................................. 83/156; 83/81; 83/157
[58] Field of Search ............... 83/156, 157, 150, 81

[56] References Cited

U.S. PATENT DOCUMENTS

| | | | |
|---|---|---|---|
| 923,109 | 5/1909 | Biggert, Jr. | 83/157 |
| 2,549,560 | 4/1951 | Archer | 83/157 |
| 3,631,750 | 1/1972 | Hanni | 83/157 |
| 3,793,916 | 2/1974 | Jarman | 83/157 |
| 4,313,357 | 2/1982 | Hawkins | 83/157 |

FOREIGN PATENT DOCUMENTS

| | | |
|---|---|---|
| 130765 | 5/1978 | Fed. Rep. of Germany . |
| 3309369 | 9/1984 | Fed. Rep. of Germany . |
| 3544899 | 7/1987 | Fed. Rep. of Germany . |
| 2074076 | 10/1981 | United Kingdom ......... 83/157 |

Primary Examiner—Hien H. Phan
Attorney, Agent, or Firm—Shenier & O'Connor

[57] ABSTRACT

Plate shears for flat workpieces, especially sheet metal, comprise a fixed lower blade (4), an upper blade (6) secured to a vertically movable blade beam (8), a cutting bench (2) arranged in front of the blades, a swivel roller bench (11) comprising several parallel rows of rollers (12) arranged behind the blades, the swivel-roller bench can be swivelled about an axis (D) substantially parallel to the cutting region of the blades and can also be moved back and forth in relation to the blades, and an adjustable stop (3) arranged behind the blades for workpieces to be cut to a given width. Swivelling of the swivel-roller bench downwardly simultaneously lowers the front of the swivel-roller bench which is closer to the lower blade.

7 Claims, 5 Drawing Sheets

PLATE SHEARS

The invention relates to plate shears for plate-shaped workpieces, in particular metal plates, comprising a stationary lower blade, an upper blade secured to a vertically movable blade beam, a cutting bench arranged in front of these blades, and a tilting roller table arranged behind the blades and having several parallel rows of rollers and being tiltable about an axis of rotation essentially parallel to the cutting edges of the blades and also movable back and forth relative to the blades essentially perpendicular to this axis, and an adjustable stop arranged behind the blades for workpieces to be cut to a given width.

In known plate shears of this kind (German patent 33 09 369) when narrow strips with, for example, a width of up to approximately 150 mm are being cut off, the tilting roller table has to be pulled back before the cutting so that the narrow strips which have been cut off the workpiece or other small parts do not get caught on the tilting roller table and the stop arranged above it but can fall freely in the downward direction. It is, therefore, not possible for the small cut-off parts to be carried away, for example, into various stacking containers via the tilting roller table.

The object of the invention is to remedy this deficiency and to design generic plate shears such that small parts which have been cut off a workpiece, in particular narrow strips, can also be carried away via the tilting roller table in an orderly fashion, i.e., without getting caught on the stop.

The object is accomplished in accordance with the invention by tilting of the tilting roller table downwards about its axis of rotation simultaneously bringing about lowering of the front edge of the tilting roller table.

In a preferred embodiment of the invention, the axis of rotation of the tilting roller table extends in front of the blades in the region of the cutting bench as tilting of the tilting roller table downwards thereby necessarily simultaneously brings about lowering of the front edge of this table.

Figure 2:
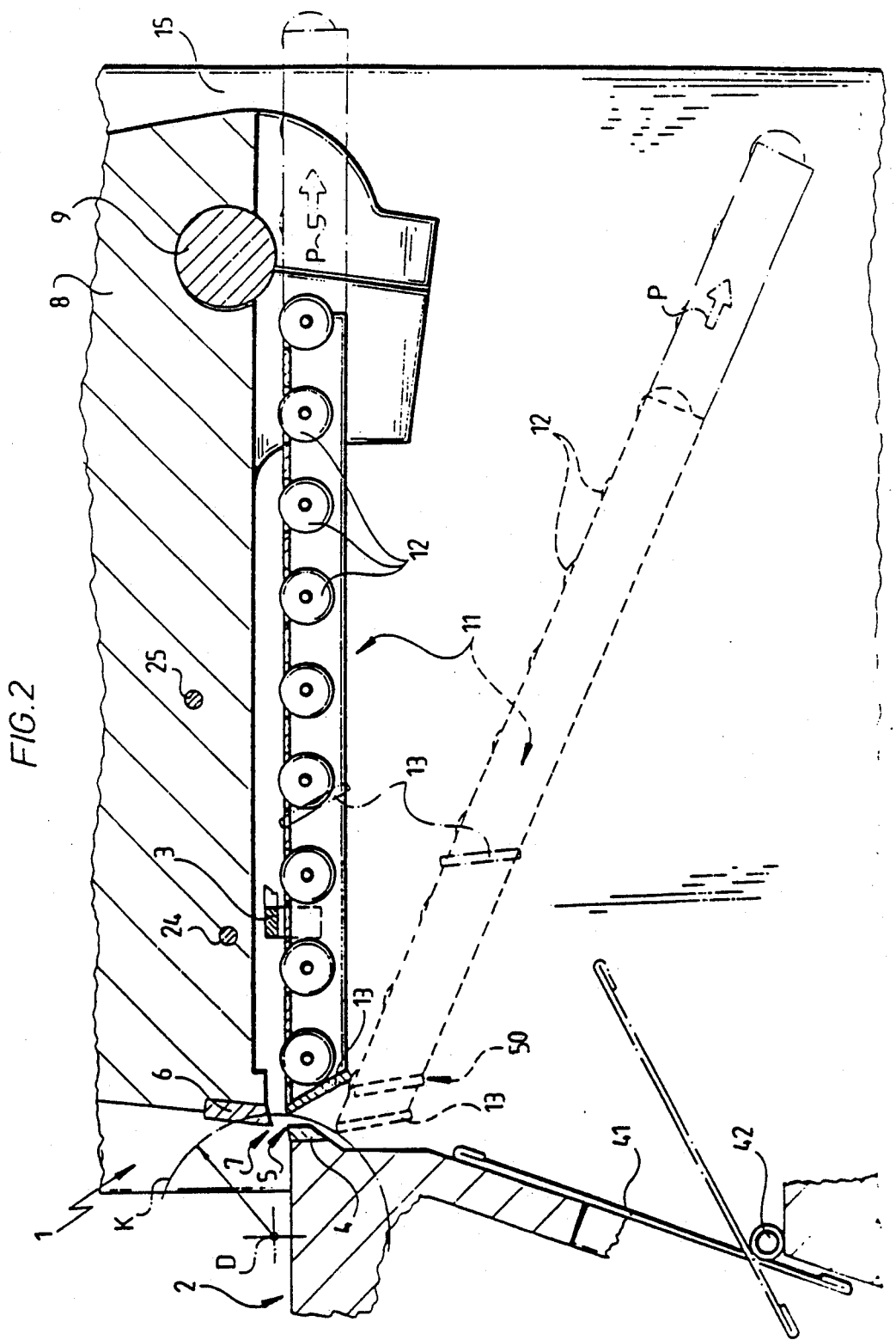
Figure 3:
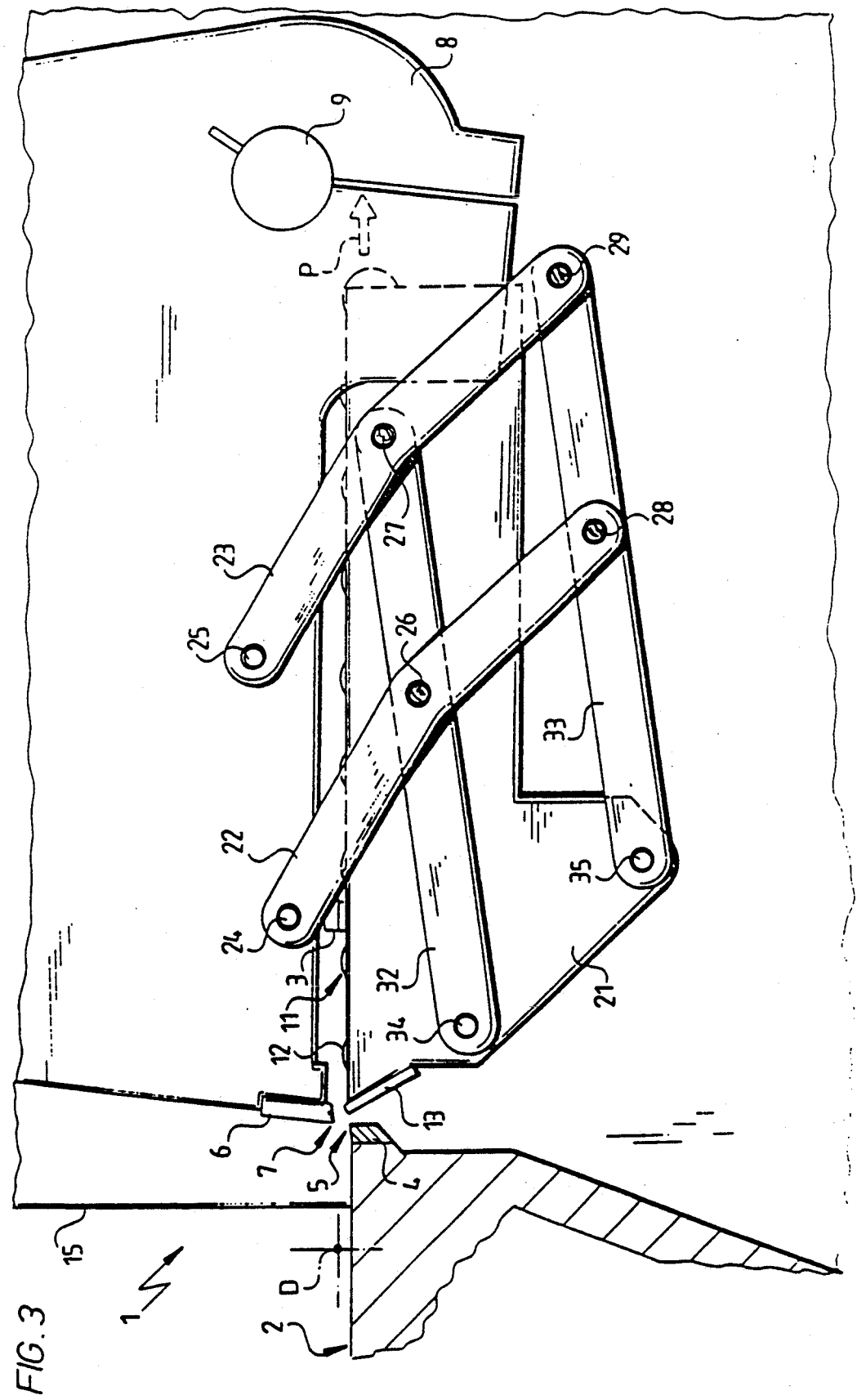
Figure 4:
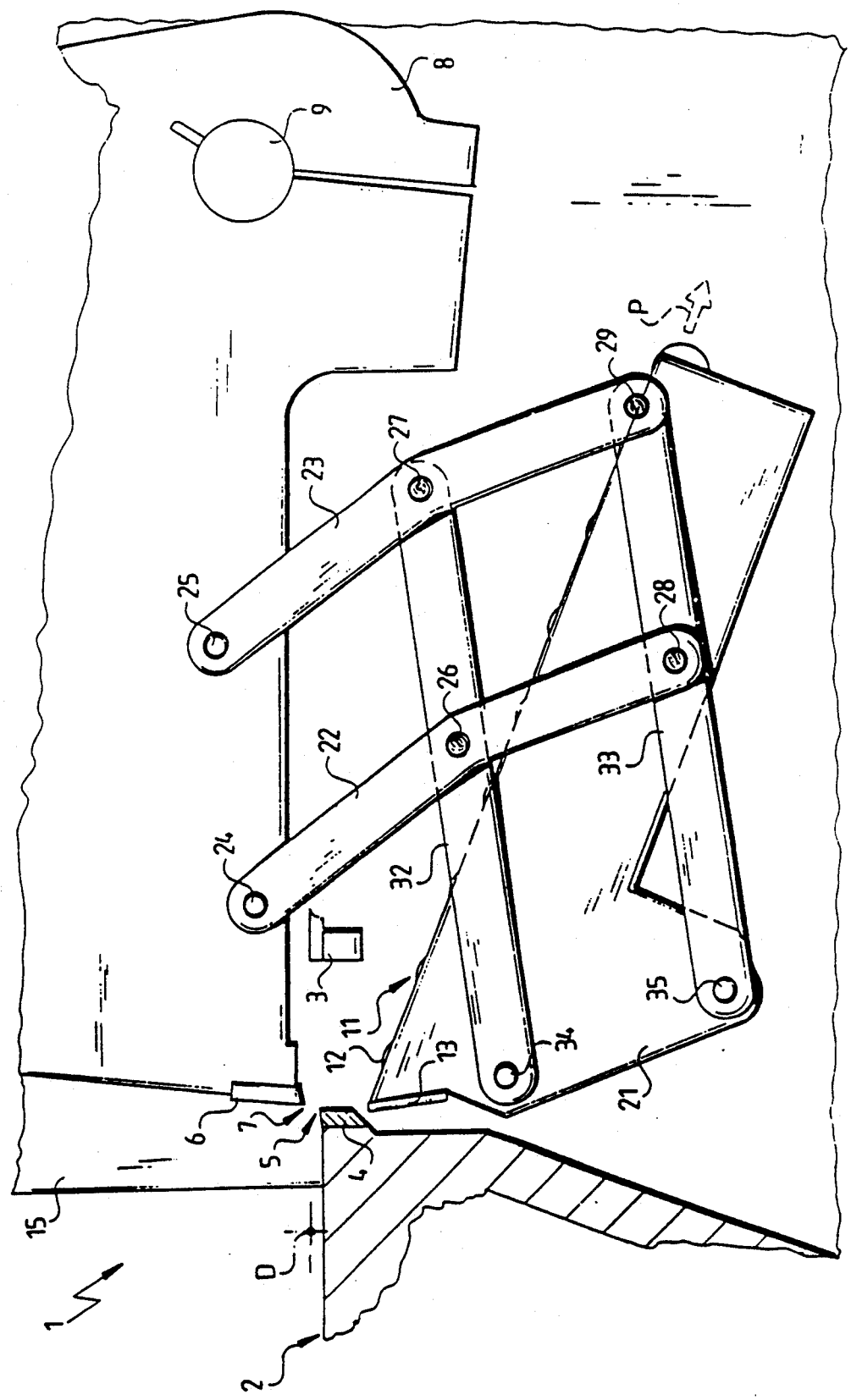

The following description of a preferred embodiment serves in conjunction with the appended drawings to explain the invention in further detail. The drawings show:

FIG. 1 schematically a partly broken-open front view of plate shears;

FIG. 2 a schematic partly sectional view along line 2—2 in FIG. 1;

FIG. 3 the rotary mounting of a tilting roller table of the plate shears in a first operating position;

FIG. 4 the rotary mounting from FIG. 3 in a different operating position; and

Figure 5:
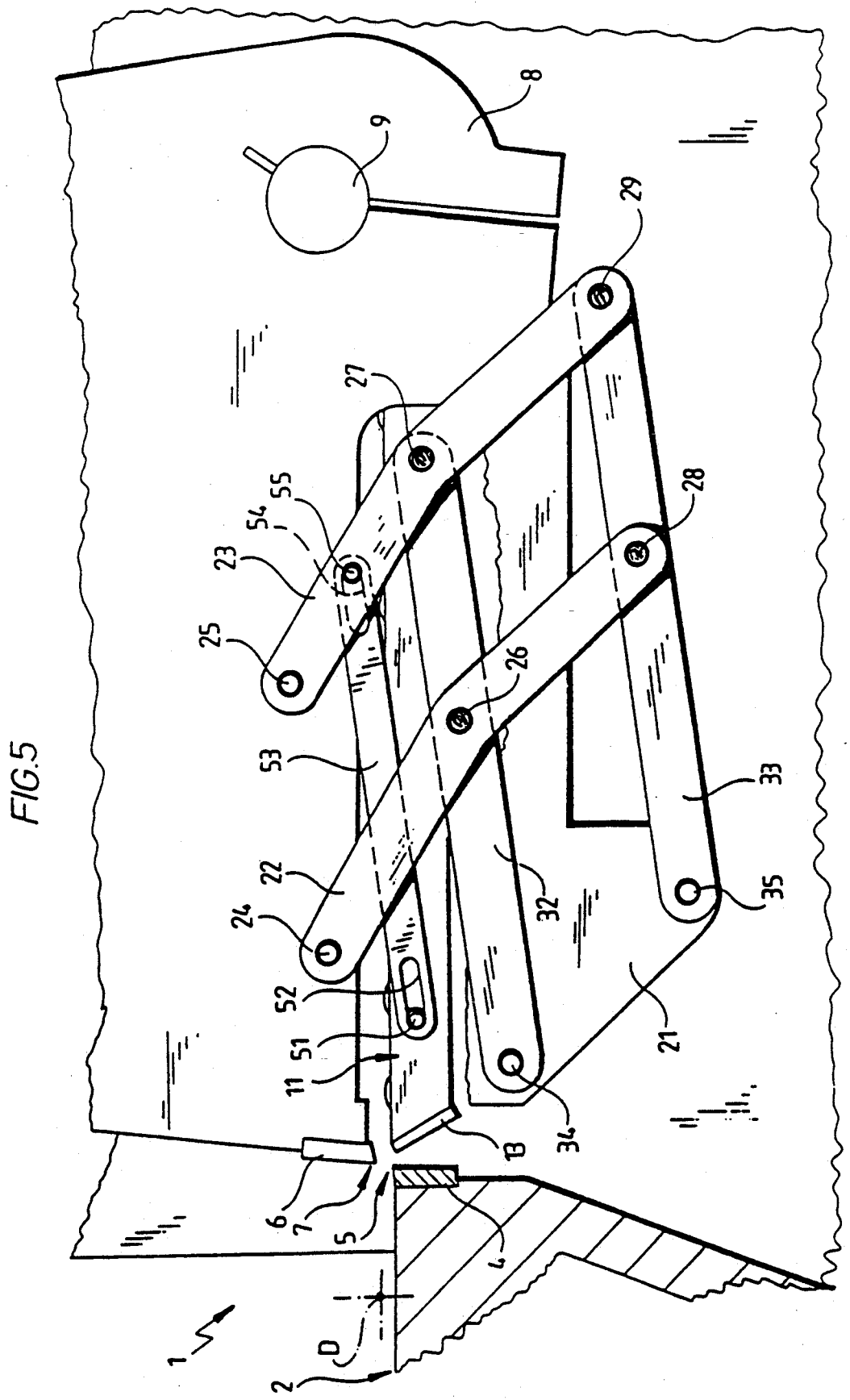

FIG. 5 a modified embodiment of plate shears.

A horizontal cutting bench 2 is formed at the front side of plate shears 1 (on the left in FIG. 2) and a workpiece which is to be cut, for example, a metal plate is placed on it and pushed into the cutting position (to the right in FIG. 2). The cutting position is determined by an adjustable stop 3 against which the front edge of the pushed-in workpiece rests. The plate shears comprise as essential components a stationary lower blade 4 whose horizontally extending cutting edge 5 may protrude somewhat beyond the horizontal surface of the cutting bench 2 and an essentially vertically movable upper blade 6 whose cutting edge 7, as shown in FIG. 1, extends slightly at an incline from the bottom left to the top right. The upper blade 6 is secured in a known manner to a blade beam 8 which is tiltable about a horizontally extending axis of rotation 9. Hence from a workpiece which is introduced between the blades 4, 6 and rests with its front edge against the stop 3, a part whose width corresponds to the spacing of the cutting edge 7 from the stop 3 is cut off during the downwardly directed movement of the upper blade 6.

Arranged at the rear side of the plate shears, i.e., behind the blades 4, 6 and opposite the cutting bench 2 is a tilting roller table 11 whose rollers 12 are arranged in several parallel rows of rollers extending essentially perpendicular to the blade edges 5, 7. As indicated by a dashed line in FIG. 2, the tilting roller table 11 is tiltable into an inclined position extending downwards to the rear. In a tiltable mounting (not illustrated in FIGS. 1 and 2) the tilting roller table 11 is also movable back and forth in the direction of arrow P (FIG. 2), a retracted position of the tilting roller table 11 being shown in dot-and-dash lines in FIG. 2.

The tilting roller table 11 also comprises at its edge facing the blades 4, 6 a continuous bar 13 which extends practically over the entire width of the plate shears 1. In the horizontal position of the tilting roller table 11 shown in FIG. 2, the bar 13 lies with its top edge somewhat higher than the cutting edge 5 of the lower blade 4. Hence workpiece parts cut off by the blades 4, 6 and resting after the cutting-off on the rollers 12 of the roller tracks without sagging between the individual roller tracks can be pushed back smoothly over the cutting edge 5 of the lower blade 4 onto the cutting bench 2 for a further cut to subsequently be made on these parts.

The tilting roller table 11 is flexible in its horizontally extending normal operating position (in a manner known per se and, therefore, not illustrated) and in several inclined positions as well, with the individual inclined positions permitting removal of cut-off parts into various stacking containers (not illustrated) and hence sorting of these parts.

Furthermore, the tilting roller table 11 is connected (in a manner also known per se) to the blade beam 8 carrying the upper blade 6 so that apart from its adjustability to various inclined positions according to FIG. 2, it also goes along with the tilting movement of the upper blade 6 about the axis of rotation 9.

Experience has shown that when small parts, i.e., relatively narrow strips with a width of, for example, up to approximately 150 mm are to be cut with plate shears of the kind described hereinabove and the stop 3, therefore, has to be moved up relatively close to the blade edges 5, 7, the small, cut-off parts get caught on the stop 3 and on the tilting roller table 11 with the result that they cannot be carried away properly on the tilting roller table. Therefore, for the cutting-off of small parts, one has hitherto helped oneself by pushing the tilting roller table 11 backwards in its horizontal position in the direction of arrow P so that the parts to be cut off were not supported by it during the cutting, which is also not necessary with relatively narrow strips. The narrow, cut-off strips then fell freely downwards into a container provided in the machine frame of the plate shears 1.

Therefore, for the cutting of small parts, the tilting roller table 11 was hitherto out of operation so that, in particular, also sorting of such small parts into various stacking containers by way of different inclined positions of the tilting roller table 11 was not possible.

In the illustrated embodiment of plate shears, the tilting of the tilting roller table 11 takes place about an axis of rotation D which is essentially parallel to the cutting edges 5, 7 of the blades 4, 6 and extends in front of the blades 4, 6 in the region of the cutting bench. Hence the front edge of the tilting roller table 11, i.e., the front top edge of the bar 13 moves on the arc of a circle K (FIG. 2). During the swivel movement of the tilting roller table 11 about the axis of rotation D, the bar 13 on the front edge of the tilting roller table 11 moves downwards, which would not be the case if the axis of rotation D extended behind the blades and the bar 13 as downward swivel movement of the tilting roller table 11 would then result in its front edge being guided upwards.

It was found that with an inclined position of the tilting roller table 11 (corresponding to the dashed illustration in FIG. 2) and the simultaneous lowering of the front edge of the tilting roller table, but with this remaining in its position adjacent to the blades 4, 6, small, cut-off parts, i.e., for example, narrow strips of sheet metal no longer get caught but can now be carried away via the tilting roller table 11 extending at an incline, for example, in various stacking containers.

In contrast with known plate shears, it is thus possible, owing to the simultaneous downward tilting of the tilting roller table and the lowering of its front edge, to leave the tilting roller table 11 in its position brought up close to the blades 4, 6 so that the small, cut-off parts do not fall freely downwards, but instead fall onto the tilting roller table and can be transported away on it.

Various possibilities are available to one skilled in the art for implementing tilting of the tilting roller table 11 downwards together with simultaneous lowering of the front edge of this table. For example, the tilting roller table could be mounted on swivel pins with lateral flanges protruding beyond its front edge on side supports 15, 16 of the plate shears 1 protruding to a corresponding extent (FIG. 1). It is also conceivable for the tilting roller table 11 to be correspondingly guided on cam tracks. In the illustrated embodiment, the axis of rotation D is a virtual axis of rotation such that it is not formed by real swivel pins or the like. Instead the swivel movement of the tilting roller table 11 takes place with the aid of a swivel mechanism (known per se) based on the parallelogram principle which will be described hereinbelow with reference to FIGS. 3 and 4.

The tilting roller table 11, of which only the rollers 12 and the bar 13 are visible in FIGS. 3 and 4, is mounted on both sides in the region of the supports 15, 16 in two bearings 21 for displacement in the direction of arrow P. The bearings 21, for their part, are rotatable about the virtual axis of rotation D mentioned hereinabove. For this purpose, a parallel guide means known per se is provided on each bearing 21. The parallel guide means comprises a pair of first links 22, 23 which are articulated at articulation points 24 and 25, respectively, on the blade beam 8 (cf. also FIG. 2). The links 22, 23 extending parallel to each other are articulated at articulation points 26, 27, 28, 29 with a pair of second links 32, 33. The free ends of the links 32, 33 are articulated with the bearing 21 at articulation points 34 and 35, respectively. The articulation points 26, 27, 28, 29 lie at the corners of a parallelogram formed by the links 22, 23 and 32, 33.

When the parallel guide means described hereinabove is actuated, the bearing 21 and hence the tilting roller table 11 with its bar 13 swivels necessarily about the virtual axis of rotation D located in front of the blades 4, 5, which, as indicated hereinabove, results in simultaneous lowering of the front edge of the tilting roller table 11, as illustrated in FIG. 4.

As shown in FIGS. 1 and 2, a flap 41 is arranged at the front side of the plate shears 1 below the cutting bench 2. The flap 41 is pivotable about an axis 42 and adjustable between a position illustrated in continuous lines and a position indicated in dot-and-dash lines in FIG. 2. When the flap 41 is in the position illustrated in continuous lines, cut-off parts, for example, scrap resulting from trimming cuts fall—when the tilting roller table 11 is pushed to the rear—freely downwards into a receiving container arranged therebelow. When the flap 41 is in the position illustrated in dot-and-dash lines in FIG. 2, small, cut-off parts then fall onto this flap and slide on it under the effect of gravity against the front side of the plate shears where they can be collected and, in the given circumstances, made to undergo a further step. As shown in FIG. 1, the flap 41 extends with the associated opening to be closed by it only over a small area of the total width of the plate shears 1 so that only small-sized parts can be caught by the flap 41 and transported to the front side of the plate shears.

As shown in FIG. 2, the front edge of the tilting roller table 11 formed by the bar 13 moves not only downwards but at the same time also forwards when swivelled about the axis D as it has to follow the arc of the circle K. Consequently, only relatively little space is available to the lower blade 4 and owing to this forward movement of the tilting roller table 11, a machine part carrying the lower blade 4 also has to have a corresponding recess (cf. FIG. 2). To avoid this, it would be expedient for slight movement to the rear to be imparted to the tilting roller table 11 simultaneously with its downward swivel movement and for it to then assume the position indicated by reference numeral 50 in FIG. 2. In this case, the lower blade 4 could be of correspondingly large design and the machine part carrying it would not require a corresponding recess, as shown in FIG. 2.

FIG. 5 shows a simple arrangement in which this rearward movement of the tilting roller table 11 can be brought about simultaneously with the downward swivel movement. A connecting rod 53 is mounted by means of an elongate hole 52 for swivel movement on a bolt 51 protruding at the side from the tilting roller table 11. The connecting rod 53 is articulated on the other side by means of an elongate hole 54 on a bolt 55 protruding at the side from the link 23. The tilting roller table 11 itself is pretensioned in its mounting 21 holding it displaceably by elastic force in the direction opposite the arrow P into the front position shown in FIG. 5. A pneumatic cylinder which is connected to the tilting roller table 11 and triggers its displacement movements can, for example, be used as elastic force.

When the mounting 21 of the tilting roller table 11 is tilted downwards with the aid of the links 22, 23, 32, 33 in accordance with FIG. 4, the tilting roller table 11 is drawn backwards by the connecting rod 53 into the position designated by reference numeral 50 in FIG. 2 and so the front edge of this table formed by the bar 13 does not collide with the lower blade 4 but moves downwards approximately on a vertical straight line, and on no account forwards in accordance with the circle K in FIG. 2. Accordingly, as shown in FIG. 5, the lower blade 4 can be of correspondingly larger design, and the recess on the machine part supporting the lower blade 4 required for entry of the bar 13 can be dispensed with.

This rearward movement of the tilting roller table 11 takes place against the elastic force, in particular, produced by a pneumatic cylinder, which holds the table 11 in its foremost position. The tilting roller table 11 is also automatically brought into tis foremost position again by this elastic force when the bearing 21 resumes its initial position shown in FIG. 5.

We claim:

1. Plate shears for plate-shaped workpieces, in particular metal plates, comprising a stationary lower blade, an upper blade secured to a vertically movable blade beam, a cutting bench arranged in front of these blades, a tilting roller table arranged behind the blades and having several parallel rows of rollers, said tilting roller table serving to transport cut-off workpiece parts away, the table is tiltable downwardly about an axis of rotation essentially parallel to the cutting edges of said blades while also movable back and forth relative to said blades essentially perpendicular to said axis of rotation, and an adjustable stop arranged behind said blades for workpieces to be cut to a given width, characterized in that tilting of said tilting roller table (11) downwards about said axis of rotation (D) simultaneously brings about lowering of a front edge (13) of said tilting roller table (11) located close to said lower blade (4), said axis of rotation (D) of said tilting roller table (11) being located in front of said blades (4, 6) in the region of said cutting bench (2).

2. Plate shears as defined in claim 1, characterized in that said axis of rotation (D) is a virtual axis of rotation, and said tilting roller table (11) is tiltable about this axis by a swivel mechanism (22, 23, 32, 33).

3. Plate shears as defined in claim 2, characterized in that said swivel mechanism comprises a parallel guide means with a pair of first links (22, 23) which are articulated on said blade beam (8) and with a pair of second links (32, 33) which are respectively articulated, on the one hand, with said first links (22, 23) and, on the other hand, with said tilting roller table (11).

4. Plate shears as defined in claim 3, wherein said swivel mechanism further comprises a connecting rod (53) which is provided with elongate holes (53, 53) and is connected, on the one hand, to said tilting roller table (11) and, on the other hand, to said first link (23), and said tilting roller table (11) is pretensioned by elastic force into a front position adjacent to said lower blade (4) so that said front edge (13) of said tilting roller table (11) moves downwards approximately on a vertical straight line during the downward tilting of said tilting roller table (11).

5. Plate shears as defined in claim 1, characterized in that said tilting roller table (11) is fixable in more than two inclined positions.

6. Plate shears as defined in claim 1, characterized in that there is attached to the front edge of said tilting roller table (11) facing said blades (4, 6) a continuous bar (13) which prevents sagging of the workpiece, in particular when the workpiece is transported back toward the blades on said tilting roller table (11).

7. Tilting roller table as defined in claim 1, characterized in that the lowering of said front edge (13) of said tilting roller table (11) simultaneously brings about rearward displacement of this table.

* * * * *

UNITED STATES PATENT AND TRADEMARK OFFICE
CERTIFICATE OF CORRECTION

PATENT NO. : 5,179,884
DATED : January 19, 1993
INVENTOR(S) : Wolfgang Kutschker and Erwin Pesold It is certified that error appears in the above-identified patent and that said Letters Patent is hereby corrected as shown below:

Column 6, Claim 4, line 3, "(53, 53)"
           should read -- (52, 54) --.

Signed and Sealed this

Ninth Day of November, 1993

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,179,884
DATED : January 19, 1993
INVENTOR(S) : Wolfgang Kutschker, et. al.

It is certified that error appears in the above-indentified patent and that said Letters Patent is hereby corrected as shown below:

On the Title page, item [30], under Foreign Application Priority Data, insert --May 26, 1989  Fed. Rep. of Germany--.

Signed and Sealed this

Eleventh Day of January, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,179,884
DATED : January 19, 1993
INVENTOR(S) : Wolfgang Kutschker and Erwin Pesold It is certified that error appears in the above-indentified patent and that said Letters Patent is hereby corrected as shown below:

On the Title page, item [30], under Foreign Application Priority Data, insert

- May 26, 1989  Fed. Rep. of Germany  P 39 17 213.9 -

This certificate supersedes Certificate of Correction issued January 11, 1994.

Signed and Sealed this

Seventh Day of November, 1995

Attest:

BRUCE LEHMAN

*Attesting Officer*          *Commissioner of Patents and Trademarks*